(12) United States Patent
Kasai et al.

(10) Patent No.: US 12,491,847 B2
(45) Date of Patent: Dec. 9, 2025

(54) VEHICLE CONTROL SYSTEM, VEHICLE CONTROL DEVICE, AND VEHICLE CONTROL METHOD

(71) Applicant: Hitachi Astemo, Ltd., Hitachinaka (JP)

(72) Inventors: Masato Kasai, Hitachinaka (JP); Keiichiro Nagatsuka, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 100 days.

(21) Appl. No.: 18/562,738

(22) PCT Filed: Feb. 2, 2022

(86) PCT No.: PCT/JP2022/003971
§ 371 (c)(1),
(2) Date: Nov. 20, 2023

(87) PCT Pub. No.: WO2022/244318
PCT Pub. Date: Nov. 24, 2022

(65) Prior Publication Data
US 2024/0246516 A1    Jul. 25, 2024

(30) Foreign Application Priority Data

May 21, 2021   (JP) .................. 2021-086002

(51) Int. Cl.
*B60T 7/12*        (2006.01)
*B60T 8/171*       (2006.01)

(52) U.S. Cl.
CPC ............ *B60T 7/12* (2013.01); *B60T 8/171* (2013.01); *B60T 2210/32* (2013.01); *B60T 2220/00* (2013.01); *B60T 2250/00* (2013.01)

(58) Field of Classification Search
CPC ........ B60T 7/12; B60T 8/171; B60T 2210/32; B60T 2220/00; B60T 2250/00;
(Continued)

(56) References Cited

U.S. PATENT DOCUMENTS

| 2013/0120573 A1* | 5/2013 | Schumann ............... B60R 1/26 348/148 |
| 2015/0206431 A1* | 7/2015 | Park ...................... B60K 28/00 701/1 |

(Continued)

FOREIGN PATENT DOCUMENTS

| JP | 2006-224700 A | 8/2006 |
| JP | 2006-227811 A | 8/2006 |

(Continued)

OTHER PUBLICATIONS

English Translation of International Search Report of International Application No. PCT/JP2022/003971 dated Mar. 29, 2022 (2 pages).

*Primary Examiner* — Joseph J Dallo
(74) *Attorney, Agent, or Firm* — Foley & Lardner LLP

(57) ABSTRACT

The present invention provides a vehicle control system, a vehicle control device, and a vehicle control method that are highly safe and prevent an own vehicle from suddenly starting during a two-stage stop. A vehicle control system 1 includes an external environment recognition unit 120 that recognizes external environment information that is information on the surroundings of the vehicle; a driver monitoring unit 130 that detects the direction of the line of sight of a driver of the vehicle; a brake holding unit 150 that maintains the state of operation of brakes of the vehicle; a brake holding control unit 144 that controls the turning ON or OFF of the brake holding unit 150; and a driver monitoring condition generation unit 143 that generates, on the basis of the external environment information detected by the external environment recognition unit, a line-of-sight condition of the driver's line of sight to be detected by the driver monitoring unit. The brake holding control unit 144 performs control to turn off the brake holding unit 150 in a
(Continued)

case where the driver's line of sight detected by the driver monitoring unit 130 satisfies the line-of-sight condition.

9 Claims, 7 Drawing Sheets

(58) Field of Classification Search
CPC .. B60T 2201/022; B60T 2201/06; B60T 7/18; B60T 8/17558; B60T 7/22; G08G 1/166; B60W 2540/225; G01S 13/931; G01S 2013/93185; G01S 2013/93271
See application file for complete search history.

(56) References Cited

U.S. PATENT DOCUMENTS

| | | | |
|---|---|---|---|
| 2019/0156677 A1* | 5/2019 | Nishimura | G08G 1/04 |
| 2021/0107493 A1* | 4/2021 | Iwashita | B60W 50/14 |
| 2022/0169176 A1* | 6/2022 | Coudre | B60K 35/22 |
| 2022/0262246 A1* | 8/2022 | Miranda | B60Q 9/00 |
| 2022/0306158 A1* | 9/2022 | Kiriki | B60W 40/08 |

FOREIGN PATENT DOCUMENTS

| | | | | |
|---|---|---|---|---|
| JP | 2009-251761 A | | 10/2009 | |
| JP | 2011-086204 A | | 4/2011 | |
| WO | WO-2017169031 A1 * | 10/2017 | | G06K 9/00805 |

* cited by examiner

FIG. 6
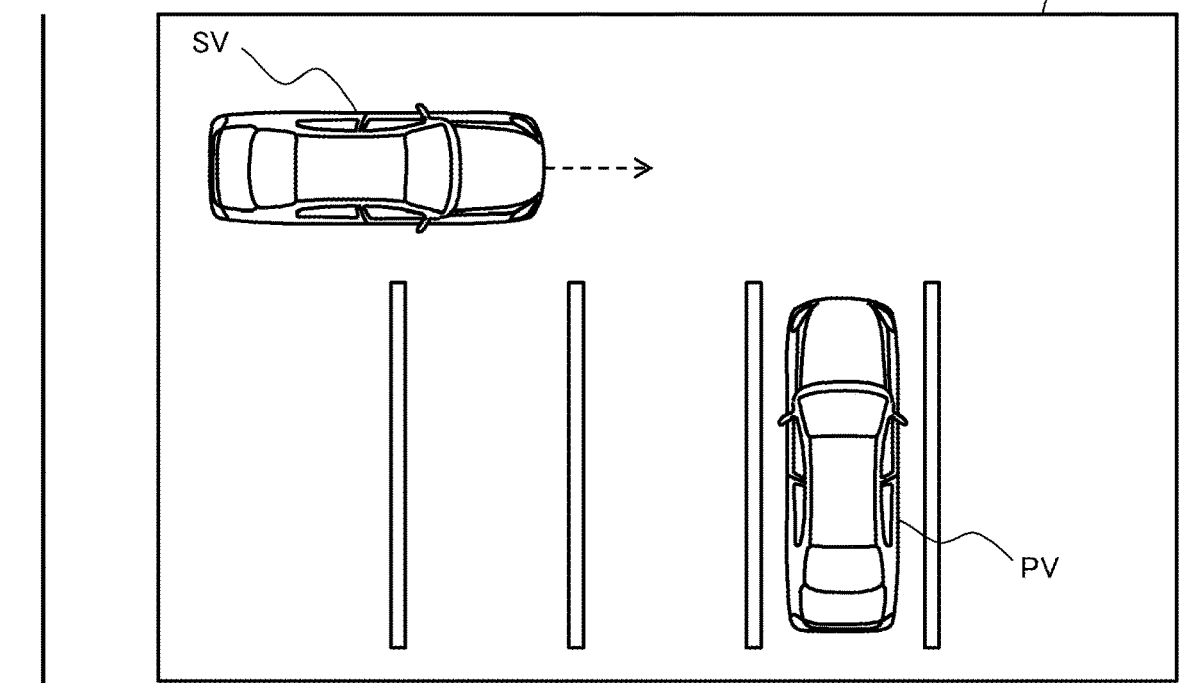
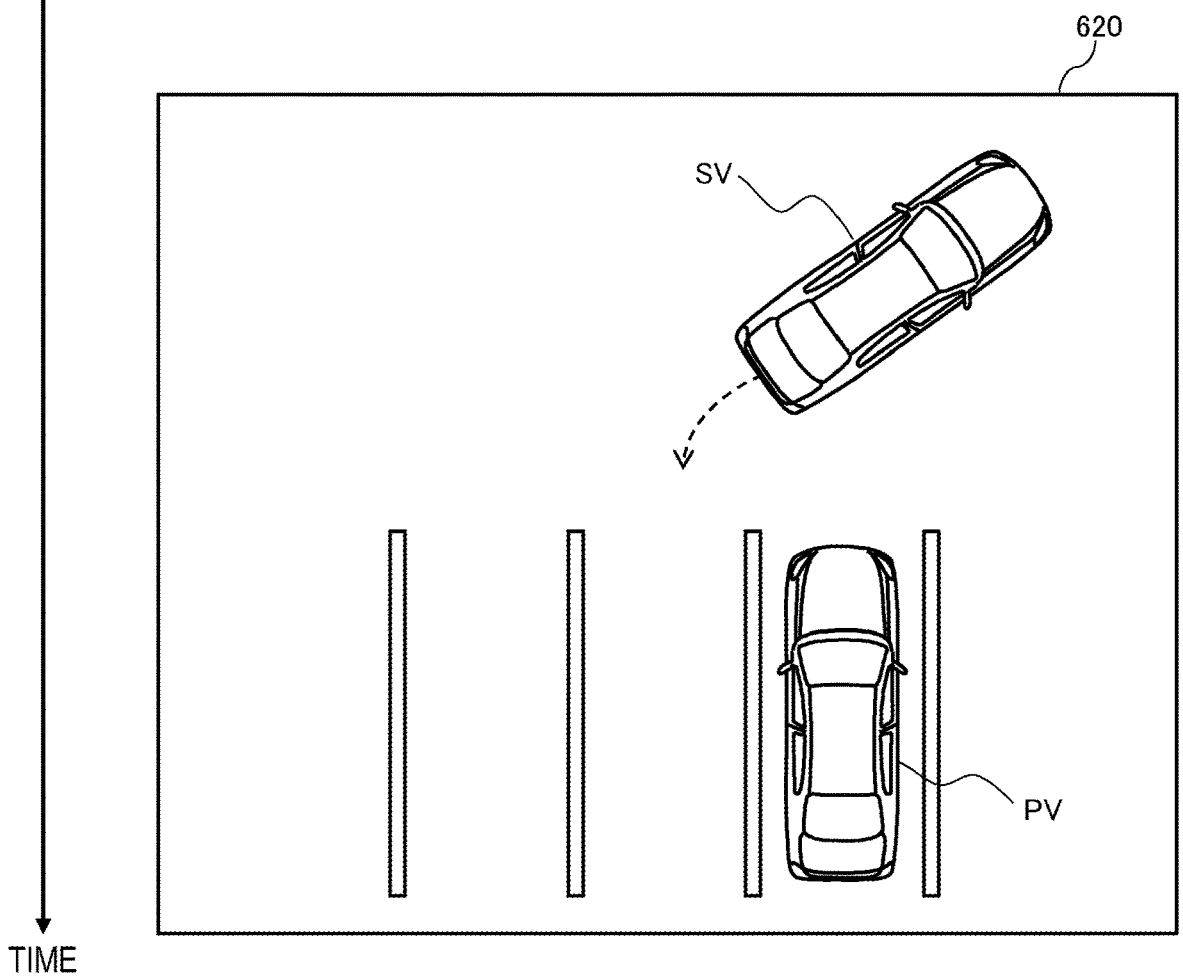
TIME

VEHICLE CONTROL SYSTEM, VEHICLE CONTROL DEVICE, AND VEHICLE CONTROL METHOD

TECHNICAL FIELD

The present invention relates to a vehicle control system, and more particularly to a vehicle control system, a vehicle control device, and a vehicle control method that control the state of operation of brakes of an own vehicle.

BACKGROUND ART

In recent years, a brake holding function for maintaining a stop state of an own vehicle even in a case where a driver cancels a brake operation has been widely used. The brake holding function maintains a brake ON state in a case where, regardless of the driving circumstances, the own vehicle stops due to deceleration resulting from the driver operating the brakes, and the brakes are turned OFF due to an accelerator operation.

In addition, a technology has been developed in which an external environment recognition device detects a vehicle, an obstacle, a blind spot, or the like, present in the surroundings of the own vehicle, and at the same time, a driver monitoring unit detects the direction of the line of sight of a driver to determine whether the driver is gazing at a point which they should be paying attention to during driving. For example, Patent Literature 1 discloses a driving assistance device that issues a warning to a driver upon determining that the driver is not directing their line of sight in the direction of a blind spot of an oncoming vehicle in a situation where the own vehicle is turning right at an intersection.

CITATION LIST

Patent Literature

PTL 1: JP 2006-227811 A

SUMMARY OF INVENTION

Technical Problem

In the case of the brake holding function described above, when the brakes are turned OFF by an accelerator operation, the own vehicle may suddenly start depending on the acceleration/deceleration level. For example, at an intersection where a temporary stop is required and there is a blind spot or the like and visibility is poor, it is necessary to perform a so-called two-stage stop operation in which a safety check is performed by stopping at a stop line, then slowly advancing to a position where visibility is favorable, and stopping again. Here, when the own vehicle suddenly starts due to an accelerator operation at a time when the brake holding function is operating and the brakes are turned OFF, there is a risk of an accident involving a collision with vehicles and pedestrians in the intersection. In contrast, if the brake holding function can be appropriately switched between enabled (ON) and disabled (OFF) according to circumstances in the surroundings of the own vehicle or inside the own vehicle, safety can be improved.

Patent Literature 1 discloses a technology for determining whether or not a driver has performed a safety check by directing their line of sight in the direction of a blind spot, on the basis of blind spot information obtained by an external environment recognition device and driver's line-of-sight information obtained by driver monitoring means. However, this technology is intended to issue a warning to a driver in a case where the driver neglects to check for safety in a blind spot direction in a situation where the own vehicle is turning right at an intersection, and no consideration is given to controlling the state of operation of the brakes, and moreover, no disclosure is made regarding a two-stage stop.

Therefore, the present invention provides a vehicle control system, a vehicle control device, and a vehicle control method that are highly safe and prevent an own vehicle from suddenly starting during a two-stage stop.

Solution to Problem

In order to solve the above problem, a vehicle control system according to the present invention includes: an external environment recognition unit that recognizes external environment information that is information on the surroundings of the vehicle; a driver monitoring unit that detects the direction of the line of sight of a driver of the vehicle; a brake holding unit that maintains the state of operation of brakes of the vehicle; a brake holding control unit that controls the turning ON or OFF of the brake holding unit; and a driver monitoring condition generation unit that generates, on the basis of the external environment information detected by the external environment recognition unit, a line-of-sight condition of the driver's line of sight to be detected by the driver monitoring unit, wherein the brake holding control unit performs control to turn OFF the brake holding unit in a case where the driver's line of sight detected by the driver monitoring unit satisfies the line-of-sight condition.

Furthermore, a vehicle control device according to the present invention includes: a driver monitoring condition generation unit that generates, on the basis of external environment information detected by an external environment recognition unit that recognizes external environment information that is information on the surroundings of the vehicle, a line-of-sight condition of the driver's line of sight to be detected by a driver monitoring unit that detects the direction of the line of sight of a driver of the vehicle; and a brake holding control unit that controls the turning ON or OFF of a brake holding unit that maintains the state of operation of brakes of the vehicle, wherein the brake holding control unit performs control to turn OFF the brake holding unit in a case where the driver's line of sight detected by the driver monitoring unit satisfies the line-of-sight condition.

Furthermore, a vehicle control method according to the present invention includes the steps of: a driver monitoring condition generation unit generating, on the basis of external environment information detected by an external environment recognition unit that recognizes external environment information that is information on the surroundings of the vehicle, a line-of-sight condition of the driver's line of sight to be detected by a driver monitoring unit that detects the direction of the line of sight of a driver of the vehicle; and a brake holding control unit performing control to turn OFF a brake holding unit that maintains the state of operation of brakes of the vehicle, in a case where the driver's line of sight detected by the driver monitoring unit satisfies the generated line-of-sight condition of the driver's line of sight.

Advantageous Effects of Invention

According to the present invention, it is possible to provide a vehicle control system, a vehicle control device, and a vehicle control method that are highly safe and prevent an own vehicle from suddenly starting during a two-stage stop.

Specifically, even in a vehicle equipped with a brake holding function, by appropriately switching the brake holding function between enabled (ON) and disabled (OFF) according to the situation in the surroundings of the own vehicle or inside the own vehicle in a scenario requiring a two-stage stop, safe vehicle control is realized in which a driver's safety check operation is reliably determined and the vehicle does not suddenly start.

Problems, configurations, advantageous effects, and the like other than those described above will be clarified by the following descriptions of the embodiments.

BRIEF DESCRIPTION OF DRAWINGS

FIG. 6 is an overhead view to illustrate the vehicle control system according to the first embodiment using a parking scenario as an example.

DESCRIPTION OF EMBODIMENTS

Hereinafter, embodiments of the present invention will be described with reference to the drawings.

First Embodiment

[Configuration of Vehicle Control System]

Figure 1:
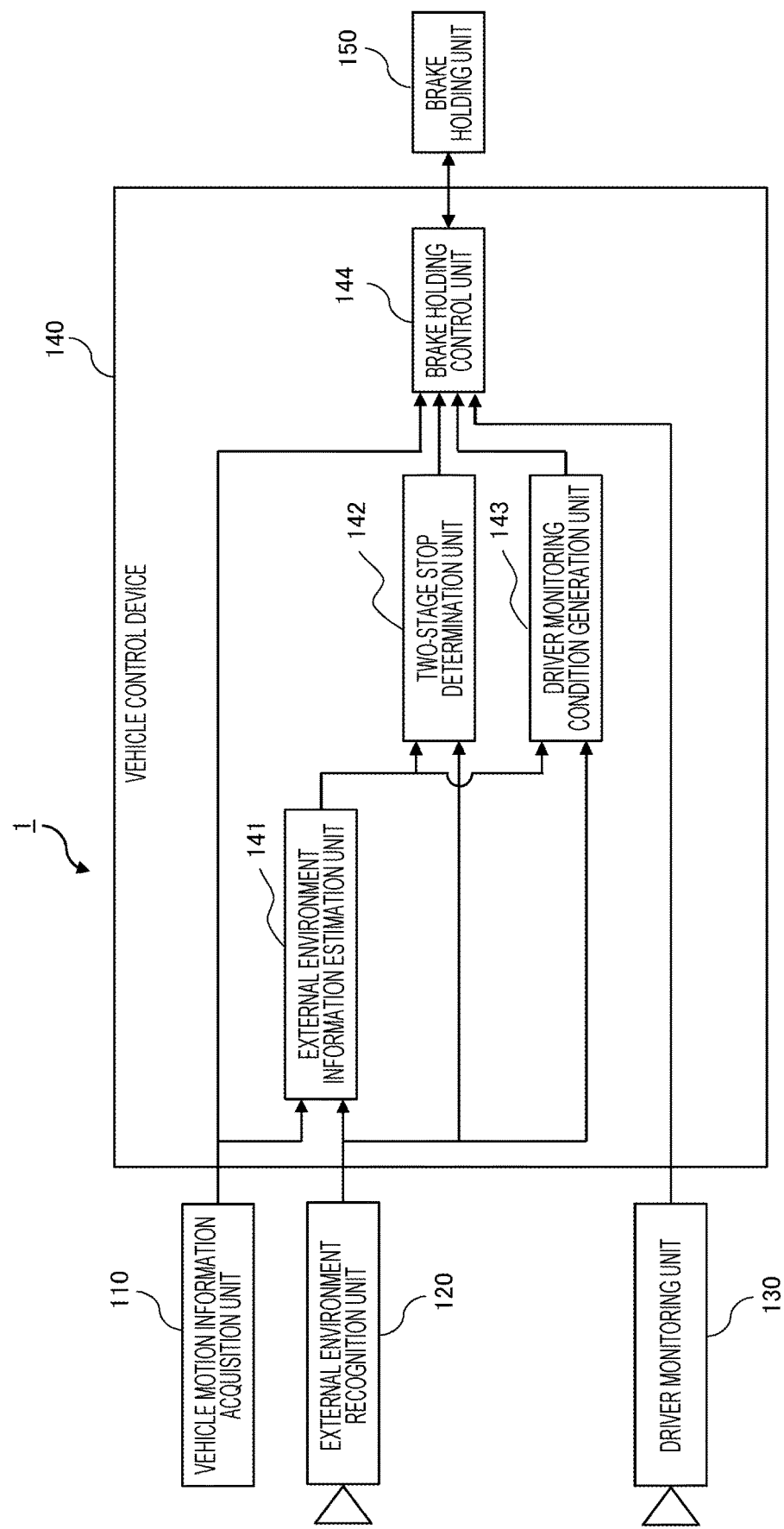
FIG. 1 is a functional block diagram illustrating an overall configuration example of a vehicle control system according to an embodiment of the present invention.

FIG. 1 is a functional block diagram illustrating an overall configuration example of a vehicle control system according to an embodiment of the present invention. As illustrated in FIG. 1, a vehicle control system 1 is mounted in a vehicle and includes a vehicle information acquisition unit 110, an external environment recognition unit 120, a driver monitoring unit 130, a vehicle control device 140, and a brake holding unit 150.

As illustrated in FIG. 1, the vehicle information acquisition unit 110 includes a wheel speed sensor that acquires wheel speed information of the own vehicle, a yaw rate sensor that acquires yaw rate information, and a brake pedal switch that acquires brake pedal pressing information, and the vehicle information acquisition unit 110 acquires vehicle motion information obtained by collecting the wheel speed information, yaw rate information, and brake pedal pressing information.

The external environment recognition unit 120 employs a camera sensor using an imaging element, a radar sensor using millimeter waves or a laser or the like, or satellite positioning information and map information to calculate external environment information such as a relative position and a relative speed between an object and the own vehicle, and the object type (for example, a pedestrian, a motorcycle, an automobile, or the like).

The driver monitoring unit 130 calculates driver's line-of-sight information using the camera sensor using an imaging element.

The vehicle control device 140 is mounted on a general ECU equipped with a CPU and a memory (ROM, RAM), and executes various processing programs stored in the memory in advance. The vehicle control device 140 includes an external environment information estimation unit 141, a two-stage stop determination unit 142, a driver monitoring condition generation unit 143, and a brake holding control unit 144. Here, the external environment information estimation unit 141, the two-stage stop determination unit 142, the driver monitoring condition generation unit 143, and the brake holding control unit 144 are realized by, for example, a processor such as a CPU (not illustrated), a ROM that stores various programs, a RAM that temporarily enables data in an arithmetic process, and a storage device such as an external storage device, and the processor such as the CPU reads and executes the various programs stored in the ROM and stores a computation result that is an execution result in the RAM or an external storage device. Note that the vehicle control device 140 is not limited to being mounted on the ECU, rather, the configuration may be such that same is mounted in another electronic control system.

In a case where the vehicle control system 1 loses the external environment information, the external environment information estimation unit 141 estimates the current external environment information by using, as inputs, past external environment information and the vehicle motion information stored in the storage unit (not illustrated).

The two-stage stop determination unit 142 receives, as an input, current actually measured external environment information from the external environment recognition unit 120 or current external environment information estimated by the external environment information estimation unit 141, determines whether the own vehicle stops in two stages, and generates two-stage stop information.

The driver monitoring condition generation unit 143 generates the driver's line-of-sight condition by using, as an input, the current actually measured external environment information from the external environment recognition unit 120 or the current external environment information estimated by the external environment information estimation unit 141. Note that the details of the driver's line-of-sight condition will be described below.

The brake holding control unit 144 receives, as inputs, vehicle motion information obtained from the vehicle information acquisition unit 110, two-stage stop information obtained from the two-stage stop determination unit 142, a driver's line-of-sight condition obtained from the driver monitoring condition generation unit 143, driver's line-of-sight information obtained from the driver monitoring unit 130, and a brake holding function state obtained from the brake holding unit 150, and transmits, to the brake holding unit 150, a brake holding control signal for controlling the enabling (turning ON) or disabling (turning OFF) of the brake holding function state.

The brake holding unit 150 receives, as an input, a brake holding control signal transmitted from the vehicle control device 140 and sets the brake holding function state. In a case where the brake holding function state is enabled (ON), the brake holding unit 150 causes operation of the brake holding function as usual and controls the turning ON or OFF of the brakes. In contrast, in a case where the brake holding function state is disabled (OFF), the brake holding unit 150 stops the operation of the brake holding function.

Figure 2:
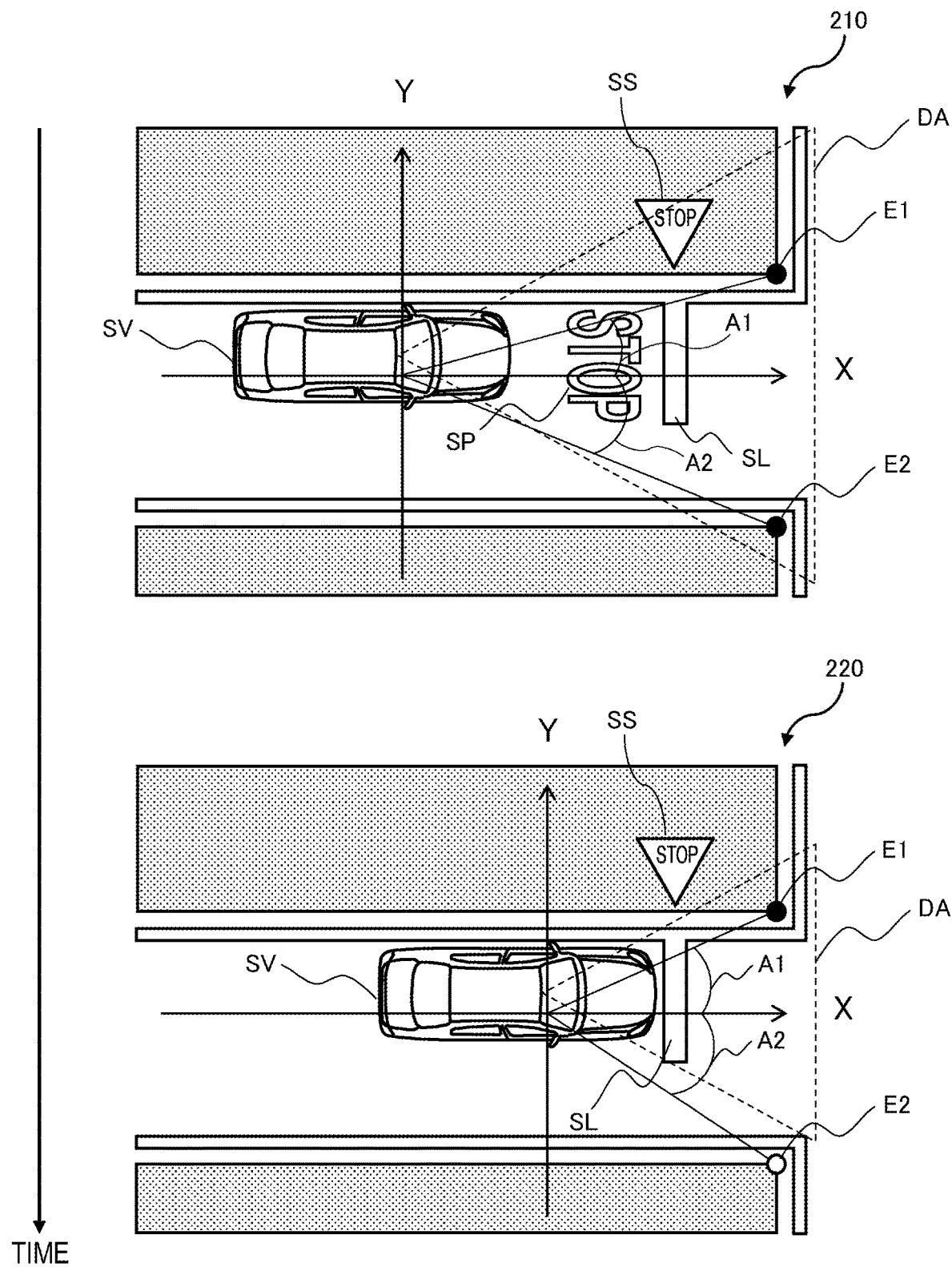
FIG. 2 is an overhead view to illustrate the vehicle control system according to a first embodiment using a temporary stop at an intersection as an example.

Here, in describing the present embodiment, a scenario, serving as a representative example, is assumed in which an own vehicle SV temporarily stops at an intersection with poor visibility on both left and right sides, as shown in FIG. 2. A pre-stop overhead view 210 is an overhead view of the surroundings of the own vehicle SV immediately before the temporary stop. In a case where the external environment recognition unit 120 installed in the own vehicle SV detects a temporary stop sign SS, a road marking SP, a stop line SL, a first blind spot edge E1, and a second blind spot edge E2, external environment information is calculated which includes the relative position between the own vehicle SV and the temporary stop sign SS, the relative position between the own vehicle SV and the road marking SP, the relative position between the own vehicle SV and the stop line SL, the relative position between the own vehicle SV and the first blind spot edge E1 and the second blind spot edge E2, the first blind spot edge angle A1 and the second blind spot edge angle A2, and the like. The first blind spot edge angle A1 and the second blind spot edge angle A2 are angles formed by line segments connecting the X axis and the origin to the first blind spot edge E1 and the second blind spot edge E2 in a coordinate system in which the center between both eyes of the driver is taken as the origin and the traveling direction is X. In the present embodiment, a case where a camera sensor having a detection range DA is used as an example of the external environment recognition unit 120, and external environment information is calculated from a captured travel route image will be described. However, the present invention is not limited to the foregoing case. For example, the configuration may be such that the external environment information is calculated using obstacle point group information on the surroundings of the travel route from a radar sensor, or using satellite positioning information and map information. In addition, information of a curved mirror CM (see FIG. 3) installed near the intersection for the driver to check for a blind spot may be included as the external environment information. The external environment recognition unit 120 performs tracking processing to track the same information chronologically with respect to the calculated external environment information, and the processed tracking information is stored in a storage unit (not illustrated) of the vehicle control device 140.

Figure 3:
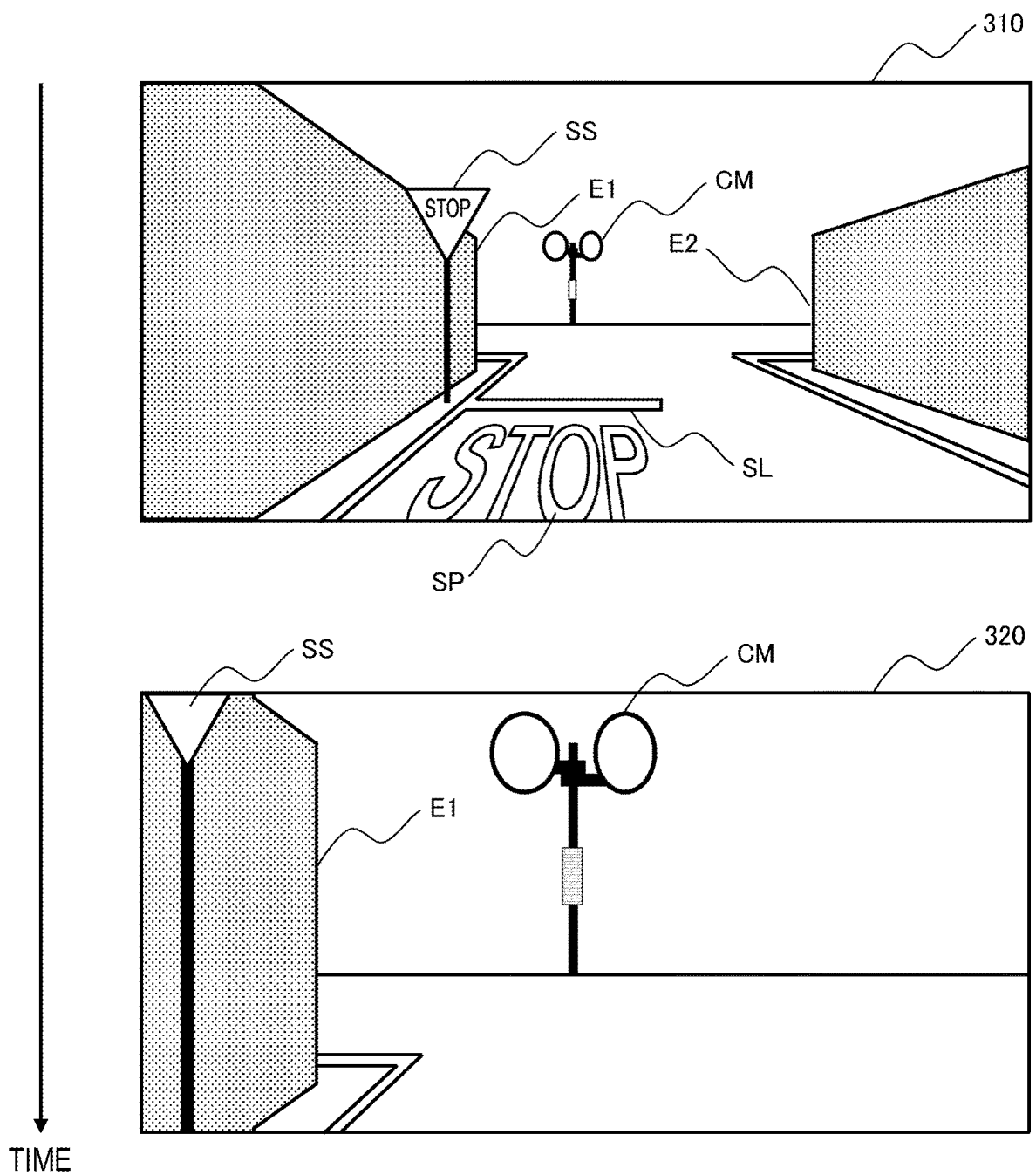
FIG. 3 is an example of a camera sensor image to illustrate the vehicle control system according to the first embodiment using a temporary stop at an intersection as an example.

Mid-stop overhead view 220 is an overhead view of the surroundings of the own vehicle SV during a stop at the stop line. In this case, the second blind spot edge E2 is outside the detection range DA of the camera sensor constituting the external environment recognition unit 120 and is lost. FIG. 3 illustrates an example in which the foregoing is viewed in a captured image of the camera sensor. In pre-stop camera sensor image 310, both the first blind spot edge E1 and the second blind spot edge E2 are included in the image. On the other hand, because the second blind spot edge E2 is outside the image in a mid-stop camera sensor image 320, it is not possible to calculate the relative position between the own vehicle SV and the second blind spot edge E2, or the second blind spot edge angle A2. In such a case, the external environment information estimation unit 141 calculates an estimated position of the second blind spot edge E2 from the relative position between the second blind spot edge E2 and the own vehicle SV immediately before the loss on the basis of the tracking information described above and a wheel speed information integral value (travel distance) and the yaw rate integral value (lateral deviation distance) after the loss of the second blind spot edge E2 obtained from the vehicle information acquisition unit 110. In other words, the external environment information estimation unit 141 estimates the external environment information outside the detection range of the external environment recognition unit 120 on the basis of the external environment information from the external environment recognition unit 120 and the vehicle motion information from the vehicle information acquisition unit 110. Here, the estimated position of the second blind spot edge E2 may be found from a self-position estimation resulting from superposing external environment information and map information. Note that the external environment information outside the detection range described above is not limited to the second blind spot edge E2. For example, in a case where the temporary stop sign SS, the road marking SP, the stop line SL, or the first blind spot edge E1 deviates from and is lost from the detection range DA of the camera sensor constituting the external environment recognition unit 120, the temporary stop sign SS, the road marking SP, the stop line SL, or the first blind spot edge E1 also corresponds to the external environment information outside the detection range.

The driver monitoring condition generation unit 143 generates, as driver's line-of-sight conditions, a blind spot direction range having an allowable angle width centered on the first blind spot edge angle A1 and the second blind spot edge angle A2, and a gaze time for determining that the driver has directed their gaze toward the blind spot. In the present embodiment, the direct confirmation of the first blind spot edge E1 and the second blind spot edge E2 is assumed, but indirect confirmation using the curved mirror CM (see FIG. 3) may be assumed and the angle in the direction of the curved mirror CM may be included in the driver's line-of-sight condition. Furthermore, in a case where a camera sensor that captures an image of a cross-road is installed at the front end of the own vehicle SV and a function for displaying a captured image on an in-cabin monitor is installed, an angle in the monitoring direction may be included in the driver's line-of-sight condition. In the present embodiment, a horizontal direction angle to the object is assumed as a main condition like the first blind spot edge angle A1 and the second blind spot edge angle A2, but a vertical direction angle may also be included in the condition.

Figure 4:
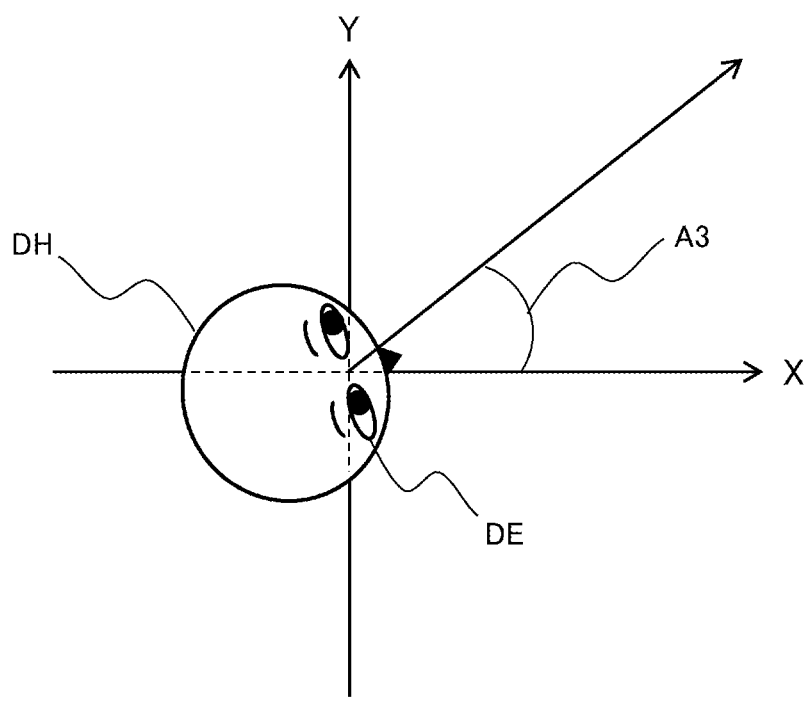
FIG. 4 is a diagram to illustrate a line of sight of a driver.

At the same time as the driver's line-of-sight condition is generated by the driver monitoring condition generation unit 143, the driver monitoring unit 130 calculates a driver's line-of-sight angle A3, which is illustrated in FIG. 4. The driver's line-of-sight angle A3 is calculated from the orientation of the driver's head DH and the corneal position of the driver's eyeball DE.

In the present embodiment, an intersection with poor visibility on both the left and right sides has been assumed, but there may also be intersections with poor visibility on only one of the left and right sides. In this case, the driver's line-of-sight condition is generated on the basis of the blind spot edge and the blind spot edge angle in the direction with good visibility, similarly to the present embodiment. However, at the same time, a check operation in the direction with good visibility is favorable is also included in the driver's line-of-sight conditions. Because there is no specific place to gaze in the direction with favorable visibility, a predetermined angular range (leftward check range/rightward check range) is set as the driver's line-of-sight condition.

[Processing Operation of Vehicle Control Device]

Figure 5:
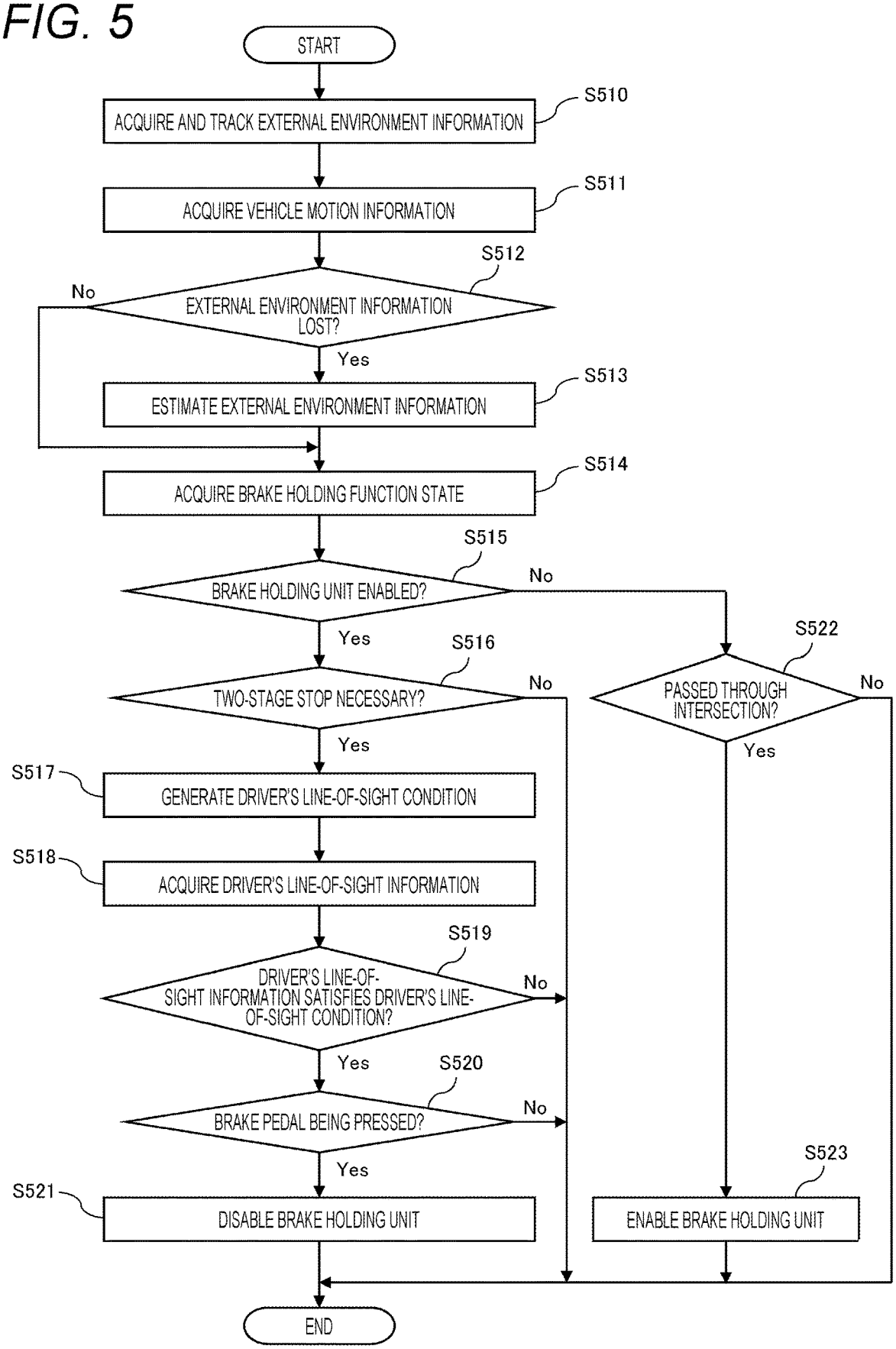
FIG. 5 is a flowchart illustrating a processing operation of a vehicle control device constituting the vehicle control system according to the first embodiment.

FIG. 5 is a flowchart illustrating a processing operation of the vehicle control device 140 constituting the vehicle control system 1 according to the present embodiment. The processing described below is repeatedly executed in the vehicle control device 140 in predetermined cycles.

First, in step S510, the external environment information is acquired by the external environment recognition unit 120 constituting the vehicle control system 1, tracking processing to track the same external environment information chronologically is performed, and the tracking information is stored in a storage unit (not illustrated) in the vehicle control device 140. Note that, in the foregoing description, the external environment recognition unit 120 was described as executing tracking processing to track the same information chronologically with respect to the calculated external environment information, but the present invention is not limited to this arrangement, and here, a case where the vehicle control device 140 executes tracking processing will be described as an example.

In step S511, the above-described vehicle motion information is acquired by the vehicle information acquisition unit 110. In step S512, the external environment information estimation unit 141 constituting the vehicle control device 140 compares the current tracking information with the past tracking information, and in a case where it is determined that there is lost external environment information (external environment information outside the above-described detection range), the processing advances to step S513. On the other hand, in a case where it is determined that there is no lost external environment information, step is skipped, and the processing advances to step S514.

In step S513, the external environment information estimation unit 141 constituting the vehicle control device 140 calculates the estimated external environment information as described above. The external environment information to be estimated includes not only a blind spot position such as the second blind spot edge E2 but also the temporary stop sign SS, the road marking SP, and the stop line SL.

In step S514, the brake holding control unit 144 constituting the vehicle control device 140 acquires the brake holding function state from the brake holding unit 150.

In step S515, the brake holding control unit 144 constituting the vehicle control device 140 determines, from the acquired brake holding function state, whether the brake holding function is enabled (ON) or disabled (OFF). In a case where the determination result indicates that the brake holding function is enabled (ON), the processing advances to step S516. On the other hand, when the determination result indicates that the brake holding function is disabled (OFF), the brake holding unit 150 has already been disabled (turned OFF) in the previous cycle, and the processing advances to step S522.

In step S516, the two-stage stop determination unit 142 constituting the vehicle control device 140 determines whether the own vehicle SV is to make a two-stage stop. Specifically, in a case where the temporary stop sign SS or the road marking SP is detected and where a blind spot or the like is detected and the intersection is an intersection with poor visibility, it is determined that the own vehicle SV performs a two-stage stop when the distance from the own vehicle SV to the stop line SL becomes equal to or less than a threshold value (the own vehicle SV approaches the stop line), and the processing advances to step S517. In a case where it is determined that a two-stage stop is not being performed, the subsequent processing is skipped and the processing flow is terminated.

In step S517, the driver monitoring condition generation unit 143 constituting the vehicle control device 140 generates the driver's line-of-sight condition as described above.

In step S518, the brake holding control unit 144 constituting the vehicle control device 140 acquires driver's line-of-sight information from the driver monitoring unit 130.

In step S519, the brake holding control unit 144 constituting the vehicle control device 140 determines whether the driver's line-of-sight information satisfies the driver's line-of-sight condition. Specifically, when the cumulative count of the cycle in which the driver's line-of-sight angle A3 satisfies the blind spot direction range within which the driver should gaze becomes equal to or larger than the threshold value (gaze time), it is determined that the driver's line-of-sight information satisfies the driver's line-of-sight condition, and the processing advances to step S520. Note that the above-described threshold value (gaze time) is, for example, one second or two seconds. However, the present invention is not limited thereto, and the threshold value (gaze time) may be appropriately set. On the other hand, in a case where it is determined that the driver's line-of-sight information satisfies the driver's line-of-sight condition, the subsequent processing is skipped, and the processing flow is terminated. In the vehicle control device 140, a cumulative count of cycles in which the driver's line-of-sight information satisfies the driver's line-of-sight condition is stored in a storage unit (not illustrated).

In step S520, the brake holding control unit 144 constituting the vehicle control device 140 determines whether the brake pedal is currently being pressed by the driver on the basis of the brake pedal pressing information included in the vehicle motion information acquired by the vehicle information acquisition unit 110. In step S521, the brake holding control unit 144 constituting the vehicle control device 140 transmits, to the brake holding unit 150, a brake holding control signal that places the brake holding function in a disabled (OFF) state.

In step S522, the brake holding control unit 144 constituting the vehicle control device 140 determines whether the own vehicle SV has passed through the intersection. Specifically, when the distance between the own vehicle SV and the stop line SP starts to increase, it is determined that the own vehicle SV has passed through the intersection, and the processing advances to step S523. On the other hand, when the determination result indicates that the own vehicle SV has not passed through the intersection, the processing flow is terminated. Here, the configuration may be such that the determination of passage through the intersection is executed on the basis of external environment information other than the stop line SP, or vehicle motion information.

In step S523, the brake holding unit 144 constituting the vehicle control device 140 transmits, to the brake holding unit 150, a brake holding control signal for returning the brake holding function state to the enabled state (ON).

Note that the vehicle control system 1 according to the present invention is applicable to a scenario where a brake holding function operates unnecessarily, and is not limited to the above-described embodiment, and includes various modifications. For example, the present invention can be applied to unnecessary operation of the brake holding function at the time of backward motion or quick turning of the steering wheel in the opposite direction (advancing) in a parking scenario as illustrated in FIG. 6. In a pre-parking overhead view 610, the vehicle control device 140 constituting the vehicle control system 1 stores, in a storage unit (not illustrated), information on parked vehicles PV on the left and right of a parking space, on the basis of the external environment information acquired by the external environment recognition unit 120. Subsequently, in a backward motion overhead view 620, in a case where the vehicle control system 1 determines, on the basis of the parked vehicle information, that the driver is gazing in the direction of the side mirror on the side where the parked vehicle is located, the brake holding function is disabled (OFF). Also at the time of quick turning of the steering wheel in the opposite direction (advancing), the brake holding function is disabled (turned OFF) in a case where the vehicle control system 1 determines, on the basis of the parked vehicle information, that the driver is gazing in the direction of a blind spot on the side where the parked vehicle is located.

Figure 7:
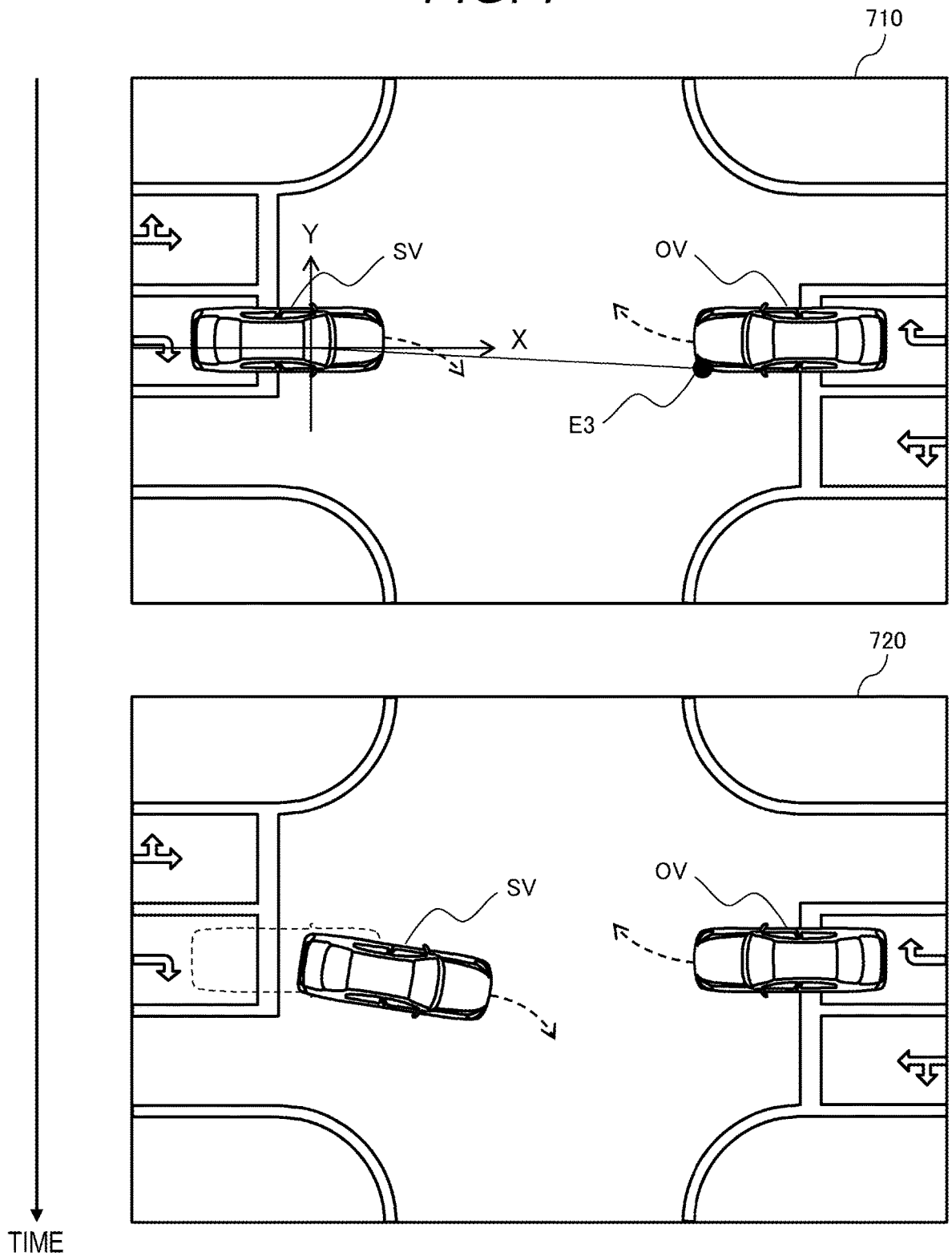
FIG. 7 is an overhead view to illustrate the vehicle control system according to the first embodiment using, as an example, a scenario of waiting to make a right turn in an intersection.

In addition, the vehicle control system 1 according to the present invention can be applied to unnecessary operation of the brake holding function in a scenario, as illustrated in FIG. 7, of waiting to make a right turn in an intersection. In an awaiting-right-turn overhead view 710, a case is assumed where the presence or absence of an oncoming straight-ahead vehicle cannot be confirmed by an oncoming awaiting-right-turn vehicle OV and where a safety check is desired by moving forward slightly as per an awaiting-right-turn advance overhead view 810. The vehicle control system 1 detects a blind spot edge E3 of the oncoming awaiting-right-turn vehicle OV on the basis of the external environment information acquired by the external environment recognition unit 120, and disables (turns OFF) the brake holding function in a case where the vehicle control system 1 determines that the driver is gazing in that direction. Here, a motion in which the driver's head DH (see FIG. 4) is tilted in the blind spot direction or a motion in which the driver leans forward may be detected and used.

As described above, according to the present embodiment, it is possible to provide a vehicle control system, a vehicle control device, and a vehicle control method that are highly safe and prevent an own vehicle from suddenly starting during a two-stage stop.

Specifically, even in a vehicle equipped with a brake holding function, by appropriately switching the brake holding function between enabled (ON) and disabled (OFF) according to the situation in the surroundings of the own vehicle or inside the own vehicle in a scenario requiring a two-stage stop, safe vehicle control is realized in which a driver's safety check operation is reliably determined and the vehicle does not suddenly start.

Furthermore, according to the present embodiment, in the execution of the two-stage stop at the intersection where the temporary stop is mandatory and in a case where there is a blind spot on one or both of the left and right sides and visibility is poor, the enabled (ON) and disabled (OFF) state of the brake holding function are appropriately switched according to the external environment information, the driver's line-of-sight information, and the like, and thus the own vehicle does not suddenly start, enabling highly safe vehicle control to be realized.

Note that the present invention is not limited to or by the above-described embodiments, and includes various modifications. For example, the above-described embodiments have been described in detail to facilitate understanding of the present invention, and are not necessarily limited to or by embodiments having all the configurations described.

REFERENCE SIGNS LIST

1 vehicle control system
110 vehicle information acquisition unit
120 external environment recognition unit
130 driver monitoring unit
140 vehicle control device
141 external environment information estimation unit
142 two-stage stop determination unit
143 driver monitoring condition generation unit
144 brake holding control unit
150 brake holding unit

The invention claimed is:

1. A vehicle control system, comprising:
an external environment recognition unit that recognizes external environment information that is information on the surroundings of the vehicle;
a driver monitoring unit that detects the direction of the line of sight of a driver of the vehicle;
a brake holding unit that maintains the state of operation of brakes of the vehicle;
a brake holding control unit that controls the turning ON or OFF of the brake holding unit;
a driver monitoring condition generation unit that generates, on the basis of the external environment information detected by the external environment recognition unit, a line-of-sight condition of the driver's line of sight to be detected by the driver monitoring unit;
a vehicle information acquisition unit that acquires vehicle motion information of the vehicle; and
an external environment information estimation unit that estimates external environment information outside a detection range of the external environment recognition unit on the basis of the vehicle motion information and the external environment information,
wherein the driver monitoring condition generation unit generates a line-of-sight condition of the driver's line of sight to be detected by the driver monitoring unit on the basis of an external environment information estimation result estimated by the external environment information estimation unit, and
wherein the brake holding control unit performs control to turn off the brake holding unit in a case where the driver's line of sight detected by the driver monitoring unit satisfies the line-of-sight condition.

2. The vehicle control system according to claim 1, further comprising:
a two-stage stop determination unit that determines whether or not the vehicle stops in two stages on the basis of the external environment information, wherein
the brake holding control unit performs control to turn off the brake holding unit in a case where the two-stage stop determination unit determines that the vehicle stops in two stages and where the line of sight of the driver satisfies the line-of-sight condition.

3. The vehicle control system according to claim 1, wherein
the external environment recognition unit recognizes, as the external environment information, a blind spot in the surroundings of a sign or road marking instructing a temporary stop, and
the driver monitoring condition generation unit generates a line-of-sight condition of the driver's line of sight to be detected by the driver monitoring unit on the basis of at least the blind spot.

4. A vehicle control device, comprising:
a driver monitoring condition generation unit that generates, on the basis of external environment information detected by an external environment recognition unit that recognizes external environment information that is information on the surroundings of the vehicle, a line-of-sight condition of the driver's line of sight to be detected by a driver monitoring unit that detects the direction of the line of sight of a driver of the vehicle;

an external environment information estimation unit that estimates external environment information outside a detection range of the external environment recognition unit on the basis of the vehicle motion information of the vehicle and the external environment information; and a brake holding control unit that controls the turning ON or OFF of a brake holding unit that maintains the state of operation of brakes of the vehicle, wherein the driver monitoring condition generation unit generates a line-of-sight condition of the driver's line of sight to be detected by the driver monitoring unit on the basis of an external environment information estimation result estimated by the external environment information estimation unit, and wherein the brake holding control unit performs control to turn off the brake holding unit in a case where the driver's line of sight detected by the driver monitoring unit satisfies the line-of-sight condition.

5. The vehicle control device according to claim 4, further comprising:

a two-stage stop determination unit that determines whether or not the vehicle stops in two stages on the basis of the external environment information, wherein the brake holding control unit performs control to turn off the brake holding unit in a case where the two-stage stop determination unit determines that the vehicle stops in two stages and where the line of sight of the driver satisfies the line-of-sight condition.

6. The vehicle control device according to claim 4, wherein the external environment recognition unit recognizes, as the external environment information, a blind spot in the surroundings of a sign or road marking instructing a temporary stop, and the driver monitoring condition generation unit generates a line-of-sight condition of the driver's line of sight to be detected by the driver monitoring unit on the basis of at least the blind spot.

7. A vehicle control method comprising the steps of:

generating, by a driver monitoring condition generation unit, on the basis of external environment information detected by an external environment recognition unit that recognizes external environment information that is information on the surroundings of the vehicle, a line-of-sight condition of the driver's line of sight to be detected by a driver monitoring unit that detects the direction of the line of sight of a driver of the vehicle;

estimating, by an external environment information estimation unit, external environment information outside a detection range of the external environment recognition unit on the basis of the vehicle motion information of the vehicle and the external environment information;

generating, by the driver monitoring condition generation unit, a line-of-sight condition of the driver's line of sight to be detected by the driver monitoring unit on the basis of an external environment information estimation result estimated by the external environment information estimation unit; and performing, by a brake holding control unit, control to turn off a brake holding unit that maintains the state of operation of brakes of the vehicle, in a case where the driver's line of sight detected by the driver monitoring unit satisfies the generated line-of-sight condition of the driver's line of sight.

8. The vehicle control method according to claim 7, further comprising the steps of:

determining, by a two stage stop determining unit, whether or not the vehicle stops in two stages on the basis of the external environment information; and performing, by the brake holding control unit, control to turn off the brake holding unit in a case where the two-stage stop determination unit determines that the vehicle stops in two stages and where the line of sight of the driver satisfies the line-of-sight condition.

9. The vehicle control method according to claim 7, further comprising the steps of:

recognizing, by the external environment recognition unit, as the external environment information, a blind spot in the surroundings of a sign or road marking instructing a temporary stop; and generating, by the driver monitoring condition generation unit, a line-of-sight condition of the driver's line of sight to be detected by the driver monitoring unit on the basis of at least the blind spot.

\* \* \* \* \*